No. 896,523. PATENTED AUG. 18, 1908.
F. EVERHART.
ANIMAL TRAP.
APPLICATION FILED JAN. 24, 1908.
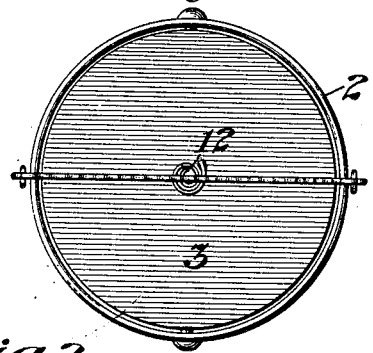
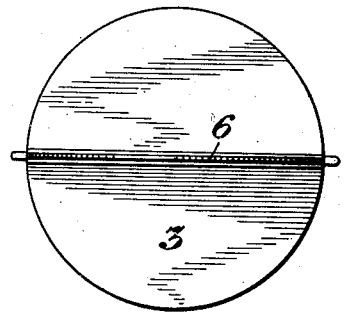
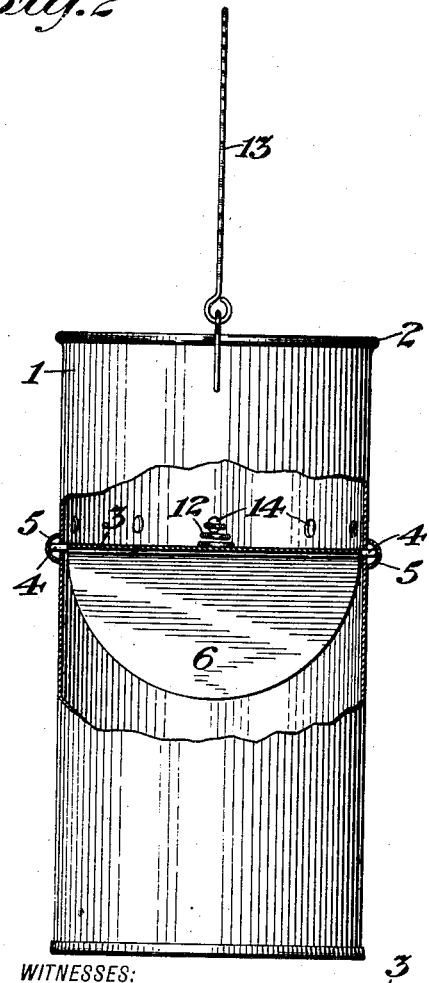
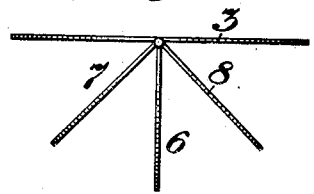
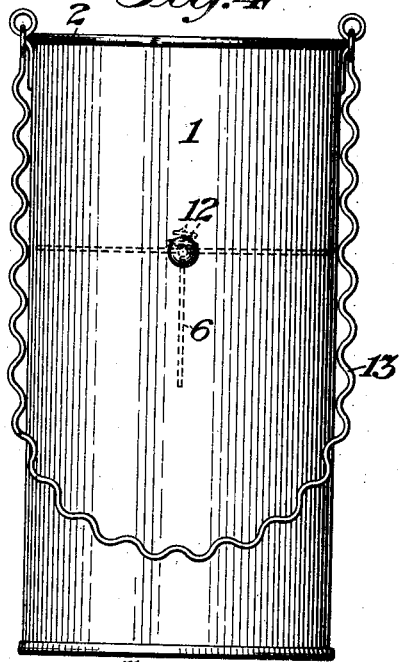
WITNESSES:
Chas. J. Clagett
Thos. H. Brown
INVENTOR
Franklin Everhart
BY
George H. Lirka Jr.
his ATTORNEY

UNITED STATES PATENT OFFICE.

FRANKLIN EVERHART, OF NEW YORK, N. Y.

ANIMAL-TRAP.

No. 896,523.  Specification of Letters Patent.  Patented Aug. 18, 1908.

Application filed January 24, 1908. Serial No. 412,431.

*To all whom it may concern:*

Be it known that I, FRANKLIN EVERHART, a citizen of the United States, and resident of New York, county of New York, State of New York, have invented certain new and useful Improvements in Animal-Traps, of which the following is a specification.

My invention relates to traps for catching animals in considerable numbers.

The trap may be used for catching rats and mice, in which case the vessel constituting the body of the trap may or may not contain a liquid for causing the drowning of the animals caught, or it may be used as a humane means for catching rabbits in large numbers, in which case the vessel will be made of large size and will be empty.

Even when used for catching rats and mice, the trap cannot always readily be exposed in places which are warm enough to prevent the freezing of the liquid and in such and other cases it may be thought best to leave the trap empty as in the case of traps designed for catching rabbits. The resort to the use of non-freezing liquids or devices for rendering water non-freezing (such as the mixing in of a considerable amount of salt) is open to objection although I do not wish to exclude such a proceeding if the circumstances call for it.

Considered broadly, the invention consists of a cylindrical vessel of considerable height within which at a considerable distance below the top is supported a balanced disk on which the bait is laid or secured. I have found that in the case of mice and rats or other suspicious animals, it is of no use to locate the balanced disk near the top of the cylindrical vessel, as these animals will easily remove the bait without exposing themselves to danger of falling into the trap, unless the disk is placed so far below the mouth of the vessel that in order to reach the bait the animal has to practically try to bear its weight upon the balanced disk. When the animal is brought to this point, that is to say, when it throws its weight upon the disk, the latter tilts suddenly and allows the animal to pass down through into the lower part of the vessel where it is kept trapped. To prevent the escape of an animal that has thus been caught, I provide one or more wings underneath the disk which wings are so constructed as to practically shut off the exit at either side of the disk. The wing or wings, if desired, serve as a balance device for maintaining the disk level upon its pivot.

These and other features of my invention are fully shown in the accompanying drawing and will be clearly set forth in the following specification.

In the drawing, Figure 1 represents a top view of my improved animal trap; Fig. 2 is a side view thereof, partly sectional, the view being taken from a point at the right in Fig. 1; Fig. 3 is a bottom view of one form of the balanced disk; Fig. 4 is a side elevation taken at right angles to that shown in Fig. 2; and Figs. 5, 6 and 7, illustrate modifications.

In the drawings, 1 is a cylindrical vessel within which at a considerable distance below the top, 2, thereof is supported a balanced disk, 3, the same being mounted on pivots, 4, 4, passing through opposite sides of the cylinder 1 and having their ends protected by caps 5, 5. To the lower side of the disk shown in Figs. 1, 2 and 3 is secured a wing, 6, which is semi-circular in outline and attached by solder or otherwise to the bottom of the disk 3 or to the common pivotal shaft 4 for the said disk and wing.

In Fig. 7, instead of using a single wing, corresponding to 6, are wings 7 and 8, each of which, like the wing 6, is semi-circular in outline. The single wing 6 or the three wings 6, 7 and 8 serve to prevent the escape of any animal that may have been caught in the lower part of the vessel 1, it being apparent that with the semi-circular wing or wings placed in the position indicated, the said wing or wings, when the disk is turned by an animal attempting to escape from below would pass, if that were possible, so close to the walls of the vessel as to prevent all possibility of an animal however small getting through, it being understood that the edge of the semi-circular pieces 6, 7 and 8 is practically equal in dimensions to one-half of the disk 3 itself, which disk is supposed to practically close the entire interior opening of the cylinder 1.

In Fig. 6 wings are shown at 9 and 10, the same being shorter than the semi-circular wing 6 and therefore occupying less space and permitting of the catching of more animals in the lower part of the trap. It may or may not be found convenient to provide a counterweight, 11, in this form of device in order to be sure of maintaining the balance of the disk 3.

At 12 I show a spiral of wire which may be utilized as a bait hook for holding the bait in place.

At 13 is illustrated a device which may be utilized as a bail or handle for the cylindrical vessel 1 and may also serve as a ladder or climbing device whereby animals, such as rats and mice, can reach the top of the cylinder.

It may serve a useful purpose to provide holes 14, 14, in the walls of the vessel which is above the balanced disk and nearly opposite the bait hook 12. By these means the odor of the bait will more readily be perceived by any animal which it is desired to capture. The bail or handle or ladder 13 may be duplicated, if desired, to furnish a greater number of climbing devices or other special devices may be substituted for the bail, which, as shown, is made in wavy or corrugated form for obvious reasons.

I show in connection with the wings 9 and 10 serrated edges which are adapted to still further operate in preventing the escape of captured animals. Such serrated edges may be applied to either or all of the wings 6, 7 and 8.

In some of the claims which follow I designate the disk 3 as a "sunken" disk, by which I mean a disk located far enough down in the receptacle to compel a mouse or rat or other small animal to press his weight upon the disk in order to secure the bait. Moreover, as the word "opening" is used in some of the claims, it refers to what in a cylindrical vessel would be called the "bore."

I claim as my invention:

1. In an animal trap, a deep vessel open at the top, a balanced disk within the same, and practically closing the opening thereof, and a bait hook on said disk, the wall of the vessel being provided with holes above the surface of the disk.

2. In an animal trap, a deep vessel, a sunken disk within the same practically closing the opening thereof when in the set position, means for normally holding the disk in a horizontal position and for clogging the passage between the wall and the middle of the vessel when a captured animal tries to escape, such means consisting of a depending wing similar in shape to and having substantially the superficial area of one-half of the said disk.

3. In an animal trap, a deep vessel, a sunken disk located within the same and practically closing the opening thereof when the disk is in a horizontal position, a bait hook on the said disk, and means for normally holding the disk in a horizontal position and for clogging the passage between the wall and the middle of the vessel when a captured animal tries to escape, such means consisting of a depending wing similar in shape to and having substantially the superficial area of one-half of the said disk.

Signed at New York, in the county of New York, and State of New York, this 23rd day of January, A. D. 1908.

FRANKLIN EVERHART.

Witnesses:
THOS. H. BROWN,
GEORGE H. STOCKBRIDGE.